US009725369B2

(12) United States Patent
Bell, Jr.

(10) Patent No.: US 9,725,369 B2
(45) Date of Patent: Aug. 8, 2017

(54) METHOD OF PROCESSING UNHARDENED CONCRETE

(71) Applicant: Charles H. Bell, Jr., Auburn, AL (US)

(72) Inventor: Charles H. Bell, Jr., Auburn, AL (US)

(73) Assignee: CRISPYCRETE, LLC, Auburn, AL (US)

( * ) Notice: Subject to any disclaimer, the term of this patent is extended or adjusted under 35 U.S.C. 154(b) by 0 days.

(21) Appl. No.: 14/681,397

(22) Filed: Apr. 8, 2015

(65) Prior Publication Data

US 2016/0297715 A1    Oct. 13, 2016
US 2017/0190631 A9    Jul. 6, 2017

Related U.S. Application Data (60) Provisional application No. 62/036,812, filed on Aug. 13, 2014.

(51) Int. Cl.
*C04B 38/10*    (2006.01)
*C04B 38/02*    (2006.01)
(Continued)

(52) U.S. Cl.
CPC ............ *C04B 38/106* (2013.01); *C04B 38/02* (2013.01); *C04B 38/085* (2013.01); *B28C 5/46* (2013.01);
(Continued)

(58) Field of Classification Search
CPC .......... C04B 18/02; C04B 18/04; C04B 18/06
(Continued)

(56) References Cited

U.S. PATENT DOCUMENTS 4,207,176 A    6/1980 Hood
4,351,670 A *  9/1982 Grice ................. C04B 18/027
                                                106/672
(Continued)

FOREIGN PATENT DOCUMENTS

DE    3727907 A1    3/1988
DE    3906645 A1    9/1990
(Continued)

OTHER PUBLICATIONS

"Aggregates". PCA. Retrieved from http://www.cement.org/cement-concrete-basics/concrete-materials/aggregates.*
(Continued)

*Primary Examiner* — Kaj K Olsen
*Assistant Examiner* — Karam Hijji
(74) *Attorney, Agent, or Firm* — Crose Law LLC; Bradley D. Crose (57) ABSTRACT

Methods and an associated system for processing unhardened concrete are disclosed. With these methods, the porosity of the unhardened concrete is significantly increased to decrease the strength so much that it can be easily broken up for sale or reuse. In at least one embodiment, the method includes adding a large volume of foam to the returned unhardened concrete and then mixing the foam with the returned concrete in the ready-mix concrete truck or other concrete mixing devices at any location including the jobsite, enroute to the concrete plant, or at the concrete plant. Through the mixing of foam with the returned concrete, the hydrated cement and aggregate particles are separated by large volumes of air voids, which significantly increase the porosity and dramatically reduce the strength of the returned concrete. The treated concrete is discharged and allowed to solidify in this weakened state, after which it is easily broken into loose particulate material that can be sold or reused.

25 Claims, 3 Drawing Sheets

(51) Int. Cl.
*C04B 38/08* (2006.01)
*C04B 103/42* (2006.01)
*C04B 103/50* (2006.01)
*C04B 18/02* (2006.01)
*C04B 18/04* (2006.01)
*B28C 5/46* (2006.01)

(52) U.S. Cl.
CPC .............. *C04B 18/02* (2013.01); *C04B 18/04* (2013.01); *C04B 2103/42* (2013.01); *C04B 2103/50* (2013.01)

(58) Field of Classification Search
USPC ........................................................ 106/409
See application file for complete search history.

(56) References Cited

U.S. PATENT DOCUMENTS

| | | | | |
|---|---|---|---|---|
| 4,551,176 | A | * | 11/1985 | Skvara .................... C04B 7/527 106/757 |
| 5,203,919 | A | | 4/1993 | Bobrowski et al. |
| 5,396,983 | A | | 3/1995 | Bozenhardt |
| 5,427,617 | A | | 6/1995 | Bobrowski et al. |
| 5,560,495 | A | | 10/1996 | Brenner |
| 5,766,524 | A | * | 6/1998 | Rashwan ................ B28B 1/004 264/140 |
| 5,778,910 | A | | 7/1998 | Brenner |
| 5,951,751 | A | | 9/1999 | Williams et al. |
| 6,153,005 | A | | 11/2000 | Welker |
| 6,375,271 | B1 | | 4/2002 | Young, III |
| 7,670,426 | B2 | | 3/2010 | Gray |
| 8,080,105 | B2 | | 12/2011 | Krozel et al. |
| 8,167,997 | B2 | | 5/2012 | Gray |
| 2003/0084980 | A1 | * | 5/2003 | Seufert ................ C04B 24/383 156/39 |
| 2004/0179896 | A1 | | 9/2004 | Curry et al. |
| 2007/0027224 | A1 | * | 2/2007 | Cowan .................... C04B 16/08 521/56 |
| 2012/0100295 | A1 | * | 4/2012 | Dubey .................... C04B 28/34 427/372.2 |

FOREIGN PATENT DOCUMENTS

| | | |
|---|---|---|
| DE | 4143029 A1 | 7/1992 |
| DE | 19518469 B4 | 5/1995 |
| DE | 4428415 A1 | 2/1996 |
| DE | 19544208 C1 | 5/1997 |
| DE | 19750296 A1 | 6/1999 |
| EP | 0286149 | 10/1988 |
| EP | 1103533 | 8/2007 |
| EP | 2468695 A1 | 6/2012 |
| WO | 95/26825 A1 | 10/1995 |
| WO | 2012/084716 A1 | 6/2012 |

OTHER PUBLICATIONS

"Concrete Pavement". PCA. Sep. 27, 2006.*
"Cellular Concrete Technical Information". CreteFoamer. Sep. 2, 2013.*
Lamond, Joseph F.; Pielert, James H. "Significance of Tests and Properties of Concrete and Concrete Making Materials". 2006. pp. 562-563.*
Kishore, Kaushal. "What is Concrete Strength and what are the factors affecting it?". Nov. 25, 2011. https://web.archive.org/web/20111125094202/http://www.engineeringcivil.com/what-is-concrete-strength-and-what-are-the-factors-affecting-it.html.*
"Classification of Aggregates". PSU. Oct. 25, 2008. Retrieved from https://web.archive.org/web/20081025105032/http://www.engr.psu.edu/ce/courses/ce584/concrete/library/materials/Aggregate/Classification%20of%20aggregates.htm.*
Valore, Rudolph. "Structural Foams". 1960. Retrieved from https://goo.gl/MXc3ll.*

* cited by examiner

METHOD OF PROCESSING UNHARDENED CONCRETE

CROSS-REFERENCE TO RELATED APPLICATION(S)

The present non-provisional patent application claims the benefit of priority of U.S. Provisional Patent Application No. 62/036,812, which is entitled "METHOD OF RECYCLING EXCESS UNHARDENED CONCRETE", which was filed on Aug. 13, 2014, and which is incorporated in full by reference herein.

FIELD OF THE INVENTION

The technology described herein relates generally to systems and methods for the processing of residual, unhardened concrete. More specifically, this technology involves significantly increasing the porosity of the unhardened concrete to decrease its strength so much that it can be easily broken up for sale or reuse. In at least one embodiment this method includes: estimating the quantity of returned concrete; adding foam to the returned concrete; mixing the foam and returned concrete together; discharging the treated concrete; allowing the treated concrete to set; converting the hardened treated concrete into a particulate or aggregate form; and using the particulate or aggregate form loose material.

BACKGROUND OF THE INVENTION

When a ready-mixed concrete truck returns to the plant after delivering a load of concrete, there is often unused unhardened concrete left over in the truck drum. This remaining concrete is referred to as returned concrete. Returned concrete is a heavy burden for the ready-mixed concrete industry.

Due to numerous environmental concerns and cost considerations, many methods to handle returned concrete have been proposed. Some methods available to the concrete industry to handle returned concrete include: (1) concrete reclaiming methods, (2) hardened concrete crushing methods, (3) casting of various concrete elements, (4) washout pits, (5) recycling reclaimed concrete treated with accelerators and super-absorbent polymers, and (6) reclaiming of unset/plastic concrete by treating it with a retarder and then later adding an accelerating agent to restore the concrete to a usable state. However, there are many deficiencies and shortcomings with these methods and systems.

One method to address this problem with returned concrete is to reclaim the cement slurry and aggregates. Unfortunately, concrete reclaiming methods have various limitations and constraints that lead to an inefficient and expensive recycling process. The inefficiencies pertain to high-energy consumption, unusable slurry or slurry water, high maintenance costs, and so forth. By way of example, DE Patent No. 3,906,645, issued to Sandau on Sep. 13, 1990, discloses a washing apparatus for returned unset/plastic concrete.

A second method to address this problem with returned concrete is discharging it in a pile, allowing it to harden, and then crushing the concrete into stockpiles. The crushed concrete can then be reused or sold. This method requires a significant investment in equipment and its maintenance to crush the hardened concrete.

A third method to address this problem with returned concrete is to cast various concrete elements. These elements may include mooring blocks, anchor blocks, decorative elements, and so forth. This method requires an investment in reusable forms, space for storing the cast elements, and labor to prepare and strip the formwork. By way of example, U.S. Patent Application Publication No. 2004/0179896A1, filed by Curry et al. and published on Sep. 16, 2004, discloses a concrete receptacle assembly and method to make synthetic riprap from returned concrete.

A fourth method to address this problem with returned concrete is to dilute it with a large amount of water and then to discharge the mixture into a washout pit to prevent the solids from binding. After a waiting period, the excess water is drained from the washout pit. The solids are then removed from the washout pit with heavy machinery and stockpiled for drying. The dried solid material is then landfilled for disposal. This process is expensive, time consuming, and environmentally unsustainable. The heavy machinery required to handle the reclaimed material remaining in the washout pit is subject to mechanical failure due to accumulation of the fine particles generated during the reclaiming process.

A fifth method to address this problem with returned concrete is to reuse unset/plastic concrete by recycling it with accelerators and super-absorbent polymers. By way of example, EP Patent No. 2,468,695, issued to Ferrari on Jun. 27, 2012, discloses a method for recycling reclaimed concrete comprising of the addition of flash setting accelerators and super-absorbent polymers to the residual fresh concrete and blending this mixture until granular material is formed. After the granular material is produced, it is discharged and allowed to harden. An objective of this method is the production of granular materials from residual concrete, which, after curing, can be used as aggregates for concrete. A disadvantage of this method is that the treated cementitious material forms a thick coating around the aggregate particles and the hardened properties of the coating significantly affect the quality of the granular material produced with this process. The amount of accelerator and super-absorbent polymer must be carefully controlled to ensure that the quality of the coating around the granular material is appropriate. The treated material also requires early breakdown to ensure that the coating around the various granular particles do not coalesce. Insufficient breakdown of the treated concrete may result in the formation of large chunks of agglomerated paste and aggregate particles. At the time of reuse, the proportion of the newly formed granular material added to the new concrete must also be done with great care to achieve the desired fresh and hardened concrete properties in the new concrete load.

A sixth method to address this problem with returned concrete is to reclaim unset/plastic concrete by treating it with a retarder and then later adding an accelerating agent to restore the concrete to a usable state. By way of example, U.S. Pat. No. 5,427,617, issued to Bobrowski et al. on Jun. 27, 1995, discloses methods and compositions for reclaiming concrete that allows one to keep the returned concrete unset in the truck mixer overnight and to reuse it the next morning in combination with new concrete, thus preventing the disposal of returned concrete and the production of waste. At the time of reuse, the proportion of residual concrete mixed with the new concrete must be done with care to achieve the desired fresh and hardened concrete properties in the new concrete load. This method does not provide the concrete producer with a method to handle returned concrete for a truck that has returned and needs to discharge the returned concrete to receive another load of concrete as soon as possible, which is most often the case in concrete plants.

Other related utility patents known in the art include the following:

U.S. Pat. No. 4,207,176, issued to Hood on Jun. 10, 1980, discloses the reclamation of unset concrete aggregates.

DE Patent No. 4,143,029, issued to Brenner on Jul. 16, 1992, discloses a waste concrete recycling trough.

DE Patent No. 4,428,415, issued to Sandau on Feb. 15, 1996, discloses a concrete washout unit with large receiver and water supply.

DE Patent Publication No. 19544208, filed by Sandau and published on May 7, 1997, discloses a washing out device for residual material such as concrete.

DE Patent Publication No. 19750296, filed by Sandau and published on Nov. 13, 1997, discloses washing equipment for residual concrete.

WO Patent Publication No. 95/26825, filed by Gleiss and published on Oct. 12, 1995, discloses a residual concrete reprocessing device with a feed screw.

WO Patent Publication No. 2012/084716, filed by Ferrari et al. and published on Jun. 12, 2012, discloses a method for producing aggregates from cement compositions.

U.S. Pat. No. 5,203,919, issued to Bobrowski on Apr. 20, 1993, discloses a method and compositions for stabilizing concrete residues.

DE Patent No. 3,727,907, issued to Bobrowski et al. on Mar. 3, 1988, discloses the recycling of concrete mixtures.

DE Patent Publication No. 19518469, filed by Buss et al. and published on May 3, 2007, discloses a process for the reprocessing of residual concrete.

U.S. Pat. No. 5,396,983, issued to Bozenhardt on Mar. 14, 1995, discloses a cleaning device, particularly for residual concrete reprocessing installations.

U.S. Pat. No. 5,560,495, issued to Brenner on Oct. 1, 1996, discloses a transporter for aggregate produced during reprocessing of residual concrete.

U.S. Pat. No. 5,778,910, issued to Brenner on Jul. 14, 1998, discloses a washing trough for residual concrete.

U.S. Pat. No. 8,167,997, issued to Gray on May 1, 2012, discloses concrete mixtures having stabilized foam admixture.

U.S. Pat. No. 7,670,426, issued to Gray on Mar. 2, 2010, discloses concrete mixtures having aqueous foam admixture.

U.S. Pat. No. 6,375,271, issued to Young, III on Apr. 23, 2002, discloses a controlled foam injection method and means for fragmentation of hard compact rock and concrete.

U.S. Pat. No. 5,951,751, issued to Williams et al. on Sep. 14, 1999, discloses a flowable fill composition and a method of producing and placing a flowable fill material.

U.S. Pat. No. 8,080,105 issued to Krozel et al. on Dec. 20, 2011, discloses methods of manufacturing and using a flowable cement-based material.

Related non-patent literature known in the art includes the following:

There exist various types of low-density, high-porosity concretes made with very high air contents, such as cellular, porous, aerated concrete, and controlled low-strength materials. However, these concrete types are not currently produced for the specific purpose to recycle or treat returned concrete. The objectives of producing low-density, high-porosity concretes are generally to improve the thermal efficiency (improved thermal insulation), improve the fire resistance, improve sound insulation, and reduce the dead load of the structure made with these concretes. Controlled low-strength materials are often used in trench fill and backfill applications where their low strength and high workability are desirable. ACI 523.1R-06 describes the production of cellular concrete and state that its main ingredient is preformed foam, which is created by diluting a liquid foam concentrate with water in predetermined proportions and passing this mixture through a foam generator. ASTM C 869 is a standard specification that covers foaming agents specifically formulated for making preformed foam for use in the production of cellular concrete.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a system and associated methods for processing unhardened concrete. More specifically, this technology involves significantly increasing the porosity of the unhardened concrete to decrease its strength so much that it can be easily broken up for sale or reuse.

In one exemplary embodiment, the technology described herein provides a method for processing unhardened concrete. The method includes: estimating a quantity of returned concrete; adding a foam to the quantity of returned concrete to increase the porosity of the concrete; mixing the added foam and returned concrete together to create a treated concrete; discharging the treated concrete; allowing the treated concrete to set into a hardened form, thereby to significantly decrease the compressive strength relative to the strength of the original returned concrete; converting the hardened treated concrete into a particulate or aggregate form loose material; and using the particulate or aggregate form loose material.

In at least one embodiment, the method also includes adding an expansive agent to the returned concrete to create bubbles in the returned concrete to significantly reduce the strength of the returned concrete.

In at least one embodiment, the expansive agent is aluminum powder.

In at least one embodiment, the expansive agent is hydrogen peroxide.

In at least one embodiment, the expansive agent is expandable micro spheres.

In at least one embodiment, the method also includes mixing in a foaming agent with the returned concrete to create bubbles to significantly reduce the strength of the returned concrete.

In at least one embodiment, the foaming agent is foam liquid concentrate that is mixed in with the returned concrete.

In at least one embodiment, the foaming agent is a synthetic foam liquid concentrate that is mixed in with the returned concrete.

In at least one embodiment, the foaming agent is an open-cell foam liquid concentrate that is mixed in with the returned concrete.

In at least one embodiment, the foaming agent is a protein-based foam liquid concentrate that is mixed in with the returned concrete.

In at least one embodiment, the foaming agent is an air-generating admixture that is mixed in with the returned concrete.

In at least one embodiment, the foaming agent is a surfactant that is mixed in with the returned concrete.

In at least one embodiment, the method further includes applying an anti-foaming agent to the particulate or aggregate form to counteract the effect of the foaming agent residue and to reduce the air content of a concrete made from the recycled particulate or aggregate form loose material.

In at least one embodiment, the anti-foaming agent is tributyl phosphate.

In at least one embodiment, the anti-foaming agent is 2-ethyl hexanol.

In at least one embodiment, the method also includes determining a quantity of foam to add to the returned concrete based upon the foaming agent selected, the concentration of the foaming agent when mixed with water, and the foam generator selected with which to add the foam.

In at least one embodiment, the method further includes recycling the concrete in particulate or aggregate form loose material that can used as embankment fill, trench backfill, void filling, and base or sub-base material for pavements.

In at least one embodiment, the method further includes recycling the concrete in particulate or aggregate form loose material into aggregate used to produce new concrete.

In at least one embodiment, the method step of adding a foam to the quantity of returned concrete to increase the porosity of the concrete further includes: utilizing a foaming machine with compressed air; utilizing a foaming agent in the foaming machine; adding the foaming agent to water; and utilizing an appropriate water-to-foaming agent ratio.

In at least one embodiment, the method also includes: recycling the particulate or aggregate form loose material after conversion; and utilizing the recycled particulate or aggregate form loose material after conversion as coarse aggregate to produce new concrete. The loose material after conversion may contain some cementitious particles that will continue to hydrate and contribute to strength gain with time.

In at least one embodiment, the method further includes: recycling the particulate or aggregate form loose material after conversion; and utilizing the recycled particulate or aggregate form loose material after conversion as fine aggregate to produce new concrete. The loose material after conversion may contain some cementitious particles that will continue to hydrate and contribute to strength gain with time.

In one exemplary embodiment, the technology described herein provides a system for processing unhardened concrete. The system includes: a means to estimate a quantity of returned concrete; a foam adder to add foam to the quantity of returned concrete; a mixer to mix the added foam and returned concrete together to create a treated concrete; a discharger to discharge the treated concrete; a discharge area configured in which to allow the treated concrete to set into a hardened form; a converter to convert the hardened treated concrete into a particulate or aggregate form loose material; and a user to determine the specific utilization of the particulate or aggregate form loose material.

In at least one embodiment, the system also includes a device to add an expansive agent to the returned concrete to create bubbles in the returned concrete and to significantly reduce the strength of the returned concrete.

In at least one embodiment, the system further includes a device to apply an anti-foaming agent to the particulate or aggregate form to counteract the foaming agent residue and to reduce the air content of concrete made from the recycled particulate or aggregate form loose material.

In at least one embodiment, the system also includes a means to determine a quantity of foam to use to add to the returned concrete based upon the foaming agent selected, the concentration of the foaming agent when mixed with water, and the foam generator selected with which to add the foam.

In at least one embodiment, the foam adder to add foam to the quantity of returned concrete of the system also includes: a foaming machine with compressed air; a foaming agent disposed in the foaming machine; and a means to add the foaming agent to water with an appropriate water-to-foaming agent ratio.

In at least one embodiment, the system also includes a crusher device to convert the hardened treated concrete into a particulate or aggregate form loose material.

In at least one embodiment, the system further includes a collector to gather and recycle the particulate or aggregate form loose material after conversion for use as coarse or fine aggregate and with which to produce new concrete.

In one exemplary embodiment, the technology described herein provides the concrete in particulate or aggregate form of loose material produced by the method disclosed, which are composed of a plurality of returned concrete fragments transformed by a foam addition and mix process to set in hardened form, thereby to decrease the strength from the original returned concrete, and once hardened, converted into particulate or aggregate form of loose material in composition.

The technology disclosed herein does not produce wastes, substantially reduces the amount of water used, eliminates much of the maintenance expense on heavy machinery, and allows the size of concrete plant sites to be reduced, and offers substantial environmental improvements associated with the processing of unhardened concrete. With this method, natural resources are not exploited and multi-faceted economic benefit is accomplished. The ease of the process and the use of non-toxic substances make this method environmentally sustainable. Environmental, social, and economic benefits achievable by this new system and method provide important sustainability improvements for the concrete industry.

By way of example, over the past decade, governments and environmental groups have increased pressure on the ready-mixed concrete industry to reduce waste discharge. The problem is caused by hydrated portland cement paste, which contains a highly alkaline substance called calcium hydroxide ($Ca(OH)_2$). When $Ca(OH)_2$ is released into the environment, it can be harmful to aquatic life and wildlife.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a system and associated methods for processing unhardened concrete by significantly increasing the porosity of the unhardened concrete to decrease its strength so much that it can be easily broken up for sale or reuse. In at least one embodiment this method includes: estimating the quantity of returned concrete; adding foam to the returned concrete; mixing the foam and returned concrete together; discharging the treated concrete; allowing the treated concrete to set; converting the hardened treated concrete into a particulate or aggregate form, and using the particulate or aggregate form loose material.

A new method and system to process returned concrete is disclosed herein. In at least one embodiment, the method includes adding a large volume of foam to the returned unhardened concrete in the ready-mixed concrete truck drum, other concrete mixers, or other concrete reclaiming devices. Through the mixing of foam with the returned concrete, the hydrated cement and aggregate particle are separated by large volumes of air voids, which dramatically reduce the strength of the resulting high porosity concrete. The treated concrete is discharged and allowed to solidify in this weakened state, after which it is easily broken into loose particulate material that can be sold or reused.

In at least one embodiment of this technology, it is also possible to add the foam to a ready-mixed concrete truck, for example, while at the jobsite or while the truck is driven on its way back to the batch plant. With this approach, the foam is mixed into the concrete while the truck is at the jobsite or returning to the batch plant. The treated concrete can then be discharged at any convenient location where it can be recycled. The addition of an expansive agent (such as aluminum powder, hydrogen peroxide, or expandable microspheres) or the mixing in of a foaming agent (such as foam liquid concentrate or an air-generating admixture) with the returned concrete to create bubbles in the returned concrete can also be used to dramatically reduce the strength of the returned concrete to allow it to be recycled. It is known in the art that through chemical reactions, gasses can be created that form a gas-bubble structure within the concrete. It is also known in the art that hollow microspheres can be used to increase the porosity of the concrete. It is also known in the art that large amounts of air voids can be created in concrete by mixing in foam liquid concentrates, air-generating admixtures, or surfactants.

In at least one embodiment, the method includes: (1) estimating the quantity of returned concrete; (2) adding foam to the returned concrete; (3) mixing the foam and returned concrete together; (4) discharging the treated concrete; (5) allowing the treated concrete to set; (6) converting the hardened treated concrete into a particulate or aggregate form; and (7) utilizing the particulate or aggregate form loose material.

It is preferred to mix the foam and unhardened returned concrete together in a ready-mixed concrete truck or some other mixing device. The treated concrete is then discharged onto the ground or into a holding bin to allow it to set and start hardening. The foam for use in this technology disclosed herein may be prepared by using any suitable foaming agent (air-bubble foam-making agent) that when mixed with water produces a foam that is stable enough to maintain its cell structure without significant collapsing when mixed with concrete. The quantity of foam needed will vary depending on the type of foaming agent, its concentration when mixed with water, and the foam generator. When using a foam generator with a solution of foaming agent in water, the volume can increase by 10 to 40 times. The addition of this large volume of foam to the returned concrete significantly increases the porosity and reduces the strength of the concrete.

Accelerating agents can also be added to shorten the set time and accelerate the hardening process of the treated concrete. Accelerating agents may also be used to shorten the processing time under cold weather conditions. Those skilled in the art are able to use accelerating admixtures to reduce the setting times and the time to reach a desired strength level.

The methods and systems disclosed herein utilize minimal water. The only water used is to rinse out any possible foam residue or paste remaining in the empty ready-mixed concrete truck mixer. Because of its very low strength, the solidified treated concrete is easily broken up with methods known in the art at an age of 5 to 72 hours or later. The dried and solidified treated concrete collapses into loose particulate material when stressed during the breaking up process. The loose particulate material may be stockpiled for sale or reuse.

Typical use of the recycled loose particulate material from this process includes use as embankment fill, trench backfill, void filling, base or sub-base material for pavements, or as aggregate in new concrete mixtures. The loose material after conversion may contain some cementitious particles that will continue to hydrate and contribute to strength gain in these applications with time.

If the recycled loose particulate material is used as aggregate in new concrete, the use of an anti-foaming agent may be needed due to the presence of foaming agent residue in the recycled material. These agents can be used to reduce the air content of concrete made with the recycled loose particulate material. There are various anti-foaming agents known in the art that will work for this purpose. An example of an antifoaming agent is tributyl phosphate, an odorless chemical available from most chemical manufactures. Another commonly available chemical, 2-ethyl hexanol, will reduce the air content in most concrete mixtures.

The technology disclosed herein does not produce wastes, substantially reduces the amount of water used, eliminates much of the maintenance expense on heavy machinery, allows the size of concrete plant sites to be reduced, and is environmentally friendly. With this method, natural resources are not exploited and multi-faceted economic benefit is accomplished. The ease of the process and the use of non-toxic substances make this method environmentally sustainable. Environmental, social, and economic benefits achievable by this new method provide important sustainability improvements for the concrete industry.

Figure 1:
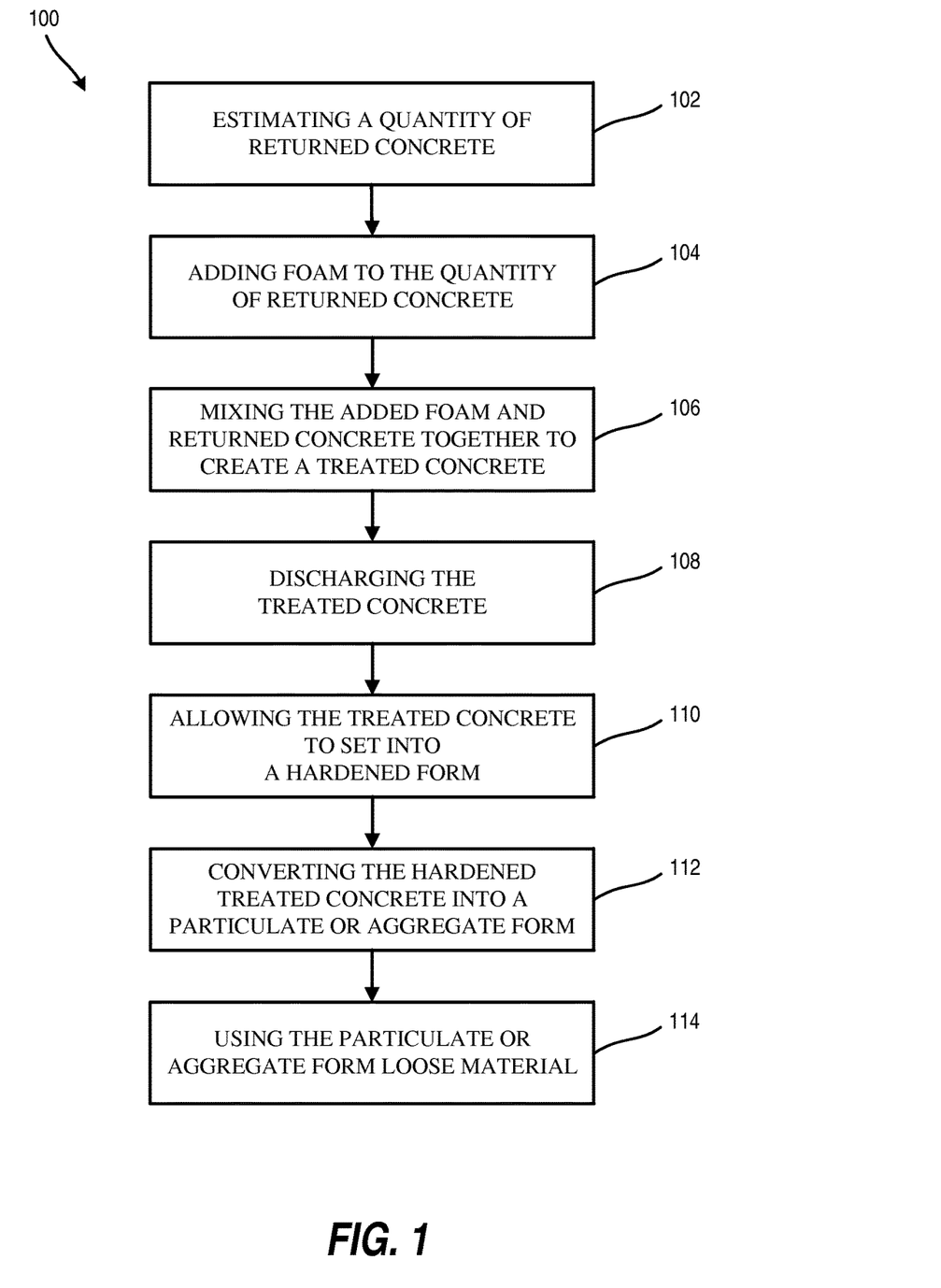
FIG. 1 is a flowchart diagram depicting a method for processing unhardened concrete, according to an embodiment of the technology described herein.

Referring now to the FIG. 1, a flowchart diagram 100 is shown, depicting a method for processing unhardened concrete. As will be apparent to one of ordinary skill in the art, upon reading this disclosure, some of the method steps may be implemented in varying order depending on the given circumstances. Additionally, one or more method steps may be omitted under the appropriate circumstances.

At step 102, the quantity of returned concrete is estimated. This step of estimating 102 can be carried out by a person in at least one embodiment. By way of example, the driver/operator of a truck containing returned concrete estimates the volume of unhardened returned concrete contained in the truck. This step of estimating 102 can be carried out by one or more generally-automated machines for such purpose in at least one embodiment. By way of example, a generally-automated machine can estimate the volume of returned concrete based on one or more factors such as weight or torque loading on the hydraulic drive which rotates the mixing drum.

At step 104, foam is added to the quantity of returned concrete to increase the porosity of the concrete. This step of adding foam 104 can be carried out by a person in at least one embodiment. By way of example, the driver/operator of a truck containing returned concrete can add foam into the returned concrete at the concrete plant, at the jobsite, or while in transit. This step of adding foam 104 can be carried out by one or more generally-automated machines for such purpose in at least one embodiment. By way of example, the foam can be added to returned concrete not only in the returned concrete truck, but also at another location such as at a processing facility for such purpose.

At step 106, added foam and returned concrete are mixed together to create treated concrete. Through the mixing of foam with the returned concrete, the hydrated cement and aggregate particle are separated by large volumes of air voids, which dramatically reduce the strength of the resulting high porosity concrete. In at least one embodiment, the mixing step 106 occurs in the truck containing the returned concrete. In at least one embodiment the mixing step 106 occurs at a location other than the return truck such as at a processing facility for such purpose.

At step 108, the treated concrete is discharged. The treated concrete is discharged and allowed to solidify in this weakened state, after which it is easily broken into loose particulate material that can be sold or reused. The treated concrete can be discharged onto the ground or in a discharge area for such purpose. The treated concrete also can be discharged into a fabricated area for such purposes.

At step 110, the treated concrete is allowed to set into a hardened form, thereby to significantly decrease the compressive strength relative to the strength of the original returned concrete. The time period in which the treated concrete is allowed to harden can vary, but as disclosed herein, time periods between 5 and 72 hours have been found to provide sufficient time to harden.

At step 112 the hardened treated concrete is converted into a particulate or aggregate form loose material. The conversion process can include use of a front-end loader or like device to break up the concrete and move to another location. The weakened bond of the hardened treated concrete is easily broken up by pushing and scooping with a front-end loader. When placed under stress by pushing on the material with a front-end loader, the dried and solidified treated concrete will collapse into loose particulate material that can be stockpiled for sale or reuse. Alternative devices are utilized to break or crush the concrete in various embodiments.

At step 114 the particulate form or aggregate form loose material is utilized. By way of example, the utilization is for embankment fill, trench backfill, void filling, and base or sub-base material for pavements in various embodiments. Also by way of example, the utilization is to produce new concrete.

Figure 2:
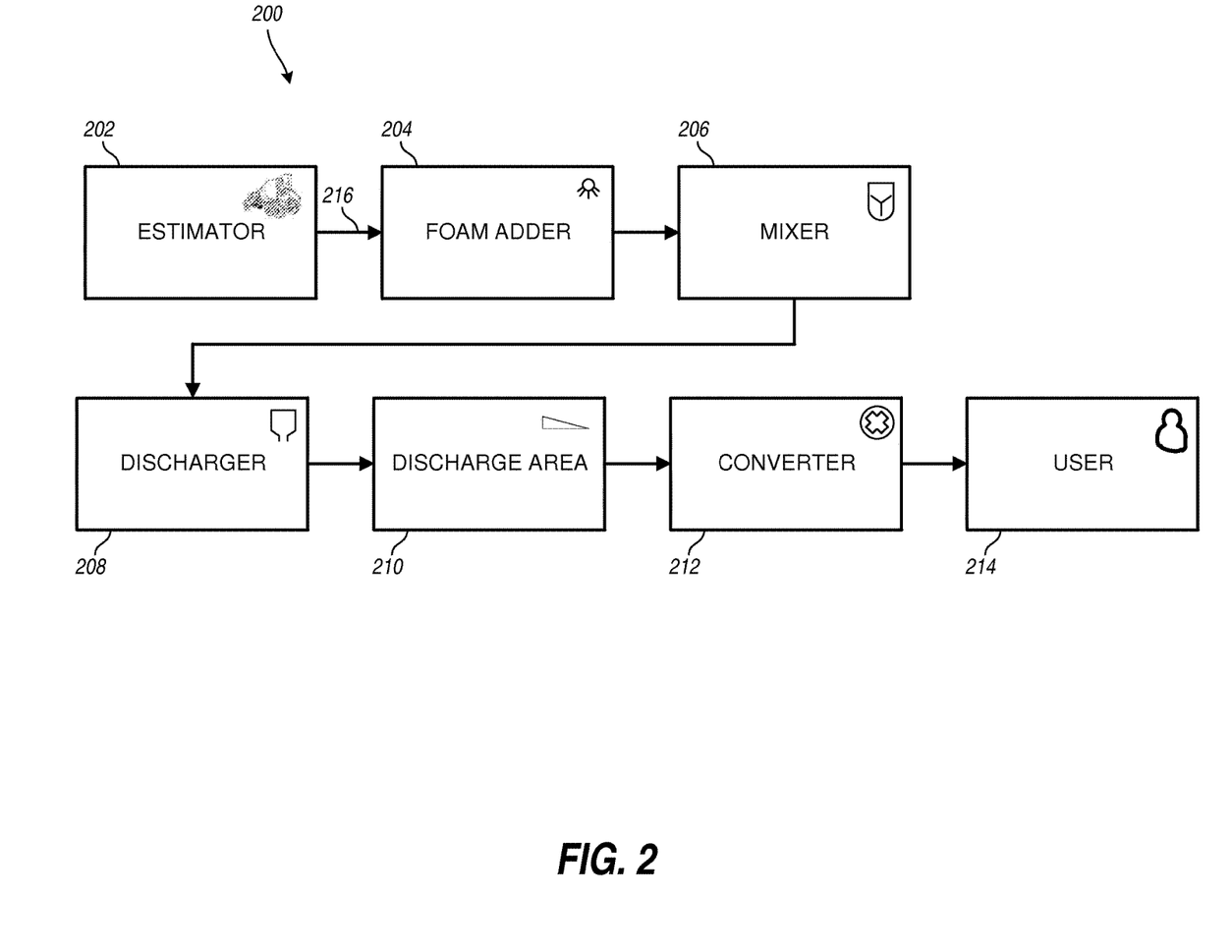
FIG. 2 is a schematic diagram depicting a system for processing unhardened concrete, according to an embodiment of the technology described herein.

Referring now to the FIG. 2, a schematic diagram 200, used generally through route 216, is shown, depicting a system for processing unhardened concrete. As will be apparent to one of ordinary skill in the art, upon reading this disclosure, some of the system components may be implemented in varying order depending on the given circumstances. Additionally, one or more system components may be omitted or added under the appropriate circumstances.

An estimator 202 is utilized to estimate the quantity of returned concrete. The estimator 202 can be a person in at least one embodiment. By way of example, the driver/operator of a truck containing returned concrete estimates the volume of unhardened returned concrete left in the drum. The estimator 202 can be one or more generally-automated machines for such purpose in at least one embodiment. By way of example, a generally-automated machine can estimate the volume of returned concrete based on one or more factors such as weight or torque loading on the hydraulic drive which rotates the mixing drum.

A foam adder 204 is utilized to add foam to the quantity of returned concrete to increase the porosity of the concrete. In at least one embodiment, the foam adder is a foaming machine. The foaming machine is configured for receipt of a foaming agent. The foaming agent is mixed with water at a predetermined water-to-foaming agent ratio and with compressed air dispersed through the foaming machine into the returned concrete.

A mixer 206 is utilized to mix the added foam and returned concrete together. Through the mixing of foam with the returned concrete, the hydrated cement and aggregate particle are separated by large volumes of air voids, which dramatically reduce the strength of the resulting high porosity concrete.

A discharger 208 is utilized to discharge the treated concrete. The treated concrete is discharged and allowed to solidify in this weakened state, after which it is easily broken into loose particulate material that can be sold or reused. The treated concrete can be discharged onto the ground in a discharge area for such purpose. The treated concrete also can be discharged into a fabricated area for such purposes.

A discharge area 210 is provided to allow the discharged treated concrete to set into a hardened form. This process serves to allow the treated concrete to continue to hydrate and harden with time. After hardening the treated concrete has a compressive strength significantly lower relative to the strength of the original returned concrete. The time period in which the treated concrete is allowed to remain in this discharge area can vary, but as disclosed herein, time periods between 5 and 72 hours have been found to provide sufficient time to harden.

A converter 212 is utilized to convert the hardened treated concrete into a particulate or aggregate form loose material. The conversion process can include use of a front-end loader or alternate device to break up the concrete and move to another location. The weakened bond of the hardened treated concrete is easily broken up by pushing and scooping with a front-end loader. When placed under stress by pushing on the material with a front-end loader, the dried and solidified treated concrete collapses into loose particulate material that was stockpiled for sale or reuse. Alternative devices are utilized to break or crush the concrete in various embodiments.

A user 214 can be introduced to determine a specific utilization. By way of example, the utilization is for embankment fill, trench backfill, void filling, and base or sub-base material for pavements in various embodiments. Also by way of example, the utilization is to produce new concrete.

Figure 3:
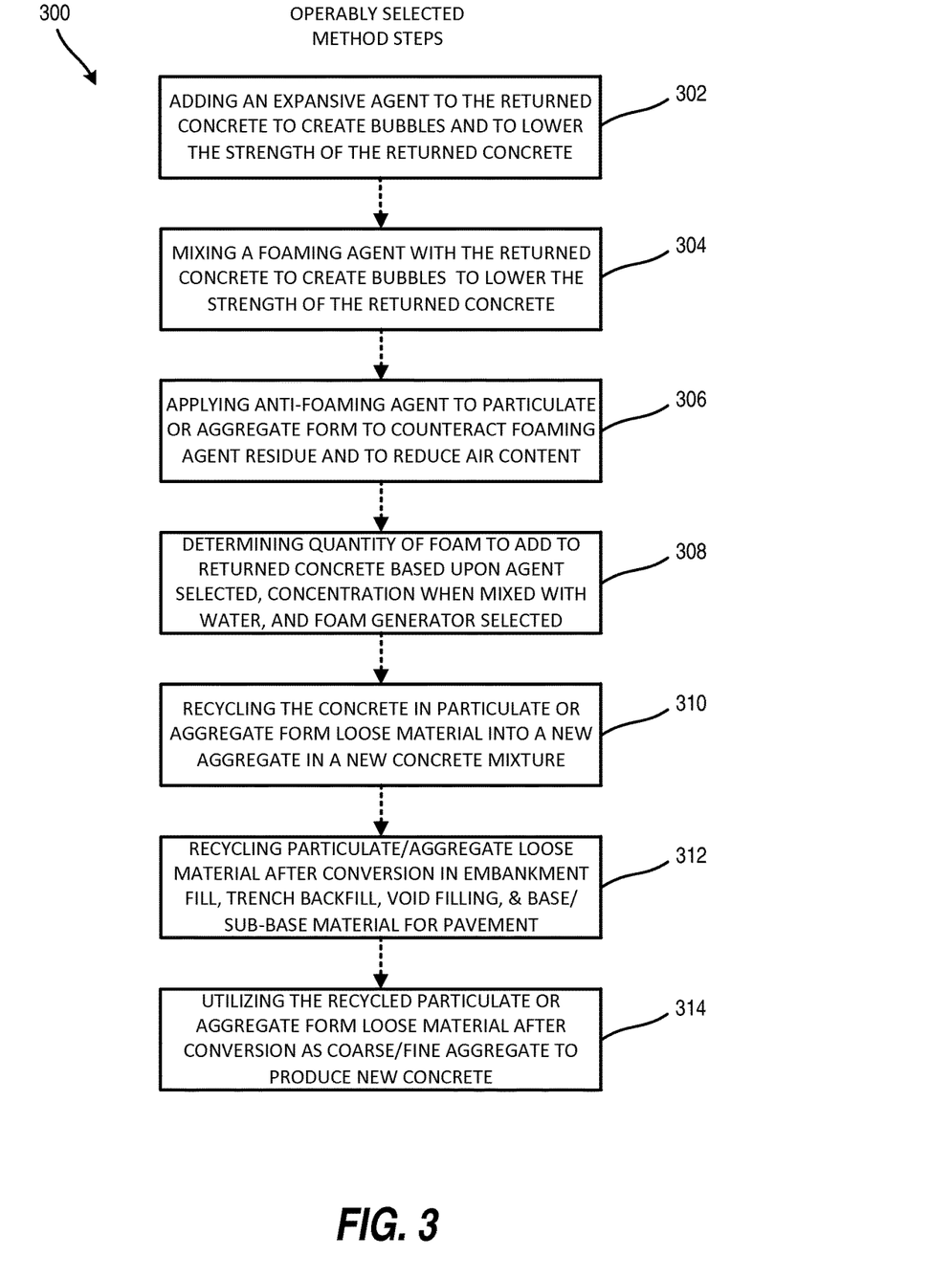
FIG. 3 a flowchart diagram depicting additional method steps for processing unhardened concrete, according to various embodiments of the technology described herein.

Referring now to the FIG. 3, a flowchart diagram 300 is shown, depicting optional, user-selectable, method steps for processing unhardened concrete, which may be utilized independently or in addition to steps depicted in FIG. 1. As will be apparent to one of ordinary skill in the art, upon reading this disclosure, some of the method steps may be implemented in varying order depending on the given circumstances. Additionally, one or more method steps may be omitted under the appropriate circumstances.

At step 302, an expansive agent is added to the returned concrete to create bubbles in the returned concrete and to significantly reduce the strength of the returned concrete.

At step 304, a foaming agent is mixed with the returned concrete to create bubbles in the returned concrete and to significantly reduce the strength of the returned concrete.

At step 306, an anti-foaming agent is added to the particulate or aggregate form to counteract the foaming agent residue and to reduce the air content of a concrete made from the recycled particulate or aggregate form loose material.

At step 308, a quantity of foam is determined to add to the returned concrete based upon the foaming agent selected, the concentration of the foaming agent when mixed with water, and the foam generator selected with which to add the foam.

At step 310, the concrete is recycled in particulate or aggregate form loose material into a new aggregate in new concrete.

At step 312, the particulate or aggregate form loose material after conversion is recycled in one or more of these applications: embankment fill, trench backfill, void filling, and base or sub-base material for pavements.

At step 314, the recycled particulate or aggregate form loose material after conversion as coarse and/or fine aggregate is recycled to produce new concrete.

The technology described herein has been tested and shown to work effectively in multiple scenarios.

EXAMPLE 1

In this example, foam was produced by using a foaming machine and a foaming agent (CMX foam concentrate or LD foam concentrate) supplied by Richway Industries Ltd. (Janesville, Iowa). Foam was added to various loads of returned ready-mixed concrete to determine the appropriate water-to-foaming agent ratio to treat each yard of returned concrete. Water-to-foaming agent ratios from 16 to 88 were evaluated, with the best ratio found to be approximately 40 to 50. High water-to-foaming agent ratios resulted in treated concrete that was too strong and difficult to break up. Low water-to-foaming agent ratios created a denser foam that sufficiently weakened the treated concrete to allow it to be broken up; however, this ratio used too much foaming agent.

EXAMPLE 2

In this example, foam was produced by using a foaming machine and a foaming agent (CMX foam concentrate or LD foam concentrate) supplied by Richway Industries Ltd. (Janesville, Iowa). Foam was added to various loads of returned ready-mixed concrete to determine the amount of foam needed to process unhardened concrete. Water-to-foaming agent ratios of 40 to 50 were used. Trials with too little foam added to the returned concrete resulted in treated concrete that was too strong and difficult to break up. With large volumes of foam added, the treated concrete was very weak and easy to break up, but excess foam was clearly visible.

In this example trials were done with 15 to 48 cubic feet of foam per cubic yard of returned concrete added and mixed in within the truck drum. This volume of foam decreased the concrete unit weight from approximately 145 pounds per cubic foot to approximately 30 to 80 pounds per cubic foot. The 3-day compressive strength of the concrete decreased from greater than 3,000 psi to a value lower than what can be measured by a typical compression-testing machine. After setting, the very low-strength, foam-treated concrete was scooped up with a front-end loader at an age of 5 to 72 hours. The weaken bond of the hardened-treated concrete was very easily broken up by pushing and scooping with a front-end loader. Trials at a concrete age of 7 days and later were performed and even at this age, the treated concrete was very easily broken up with a front-end loader because of its very low strength. When placed under stress by pushing on the material with a front-end loader, the dried and solidified treated concrete collapsed into loose particulate material that was stockpiled for sale or reuse.

EXAMPLE 3

This is an example where the recycled loose particulate material was collected and used as coarse and fine aggregate to produce new concrete. Returned concrete was treated as discussed in Example 2. After setting, the very low-strength, foam-treated concrete was scooped up with a front-end loader and stockpiled. Four cubic feet of the loose particulate material was collected for use as all the aggregate to produce a new concrete mixture. An anti-foaming agent (Air-Minus) supplied by FritzPak was added to reduce the total air content in the new concrete. After mixing, a total air content of 2.0 percent was obtained when tested in accordance with ASTM C231. Cylinders were made and tested in accordance with ASTM C39 and a 28-day strength of 4,500 psi obtained. These results indicate that concrete with acceptable properties can be made with the recycled loose particulate material obtained from recycling treated returned concrete.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology disclosed herein and are intended to be covered by the following claims.

What is claimed is:

1. A method for processing unhardened concrete that increases the porosity of the unhardened returned concrete, which decreases its strength by greater than 80 percent when compared to the strength of the original returned concrete, after which it can be easily broken up into a loose particulate material for sale or reuse, the method comprising the steps of:
   estimating a quantity of returned concrete comprising original coarse aggregate, a mixture of fine aggregate, and partially hydrated cement;
   adding a chemical admixture or a combination of chemical admixtures to the quantity of returned concrete to increase the porosity of the concrete;
   mixing the added chemical admixture and returned concrete together to create treated concrete;
   discharging the treated concrete; and
   allowing the treated concrete to set into a hardened form with much less strength relative to the strength of the original returned concrete;
   converting the hardened treated concrete into a particulate or aggregate form loose material that substantially comprises the original coarse aggregate and a mixture of fine aggregate, partially hydrated cement, and chemical admixture or chemical admixtures residue;
   wherein the hardened form treated concrete has a strength that is decreased by greater than 80 percent when compared to the strength of the original returned concrete.

2. The method of claim 1, further comprising:
   utilizing the particulate or aggregate form loose material.

3. The method of claim 1, wherein the chemical admixture is an expansive agent either used individually or in combination with other chemical admixtures.

4. The method of claim 1, wherein the chemical admixture is a foaming agent either used individually or in combination with other chemical admixtures.

5. A method for processing unhardened concrete, the method comprising:
   estimating a quantity of returned concrete comprising original coarse aggregate, a mixture of fine aggregate, and partially hydrated cement;
   adding a foam which comprises a foaming agent to the quantity of returned concrete to increase the porosity of the concrete;
   mixing the added foam and returned concrete together to create treated concrete;
   discharging the treated concrete;
   allowing the treated concrete to set into a hardened form, wherein the hardened form treated concrete has a strength that is decreased by greater than 80 percent when compared to the original returned concrete;
   converting the hardened treated concrete into a particulate or aggregate form loose material that substantially comprises the original coarse aggregate and a mixture of fine aggregate, partially hydrated cement, and foaming agent residue; and
   utilizing the particulate or aggregate form loose material.

6. The method of claim 5, further comprising:
   adding an expansive agent to the returned concrete to create bubbles in the returned concrete to reduce the strength of the returned concrete, wherein the hardened form treated concrete has a strength that is decreased by greater than 80 percent when compared to the strength of the original returned concrete.

7. The method of claim 6, wherein the expansive agent is aluminum powder.

8. The method of claim 6, wherein the expansive agent is hydrogen peroxide.

9. The method of claim 6, wherein the expansive agent is expandable micro spheres.

10. The method of claim 5, further comprising:
    mixing in the foaming agent with the returned concrete to create bubbles in the returned concrete and to reduce the strength of the returned concrete, wherein the hardened form treated concrete has a strength that is decreased by greater than 80 percent when compared to the original returned concrete.

11. The method of claim 10, wherein the foaming agent is foam liquid concentrate.

12. The method of claim 10, wherein the foaming agent is a synthetic foam liquid concentrate.

13. The method of claim 10, wherein the foaming agent is a protein-based foam liquid concentrate.

14. The method of claim 10, wherein the foaming agent is an air-generating admixture.

15. The method of claim 10, wherein the foaming agent is a surfactant.

16. The method of claim 10, further comprising:
    applying an anti-foaming agent to the particulate or aggregate form to counteract a residue of the foaming agent and to reduce the air content of a concrete made from the recycled particulate or aggregate form loose material.

17. The method of claim 16, wherein the anti-foaming agent is tributyl phosphate.

18. The method of claim 16, wherein the anti-foaming agent is 2-ethyl hexanol.

19. The method of claim 10, further comprising:
    determining a quantity of foam to use to add to the returned concrete based upon the foaming agent selected, the concentration of the foaming agent when mixed with water, and the foam generator selected with which to add the foam.

20. The method of claim 5, further comprising:
    recycling the concrete in particulate or aggregate form loose material into a new aggregate in new concrete.

21. The method of claim 5, wherein the method step of adding a foam to the quantity of returned concrete to increase the porosity of the concrete further comprises:
    utilizing a foaming machine with compressed air;
    utilizing the foaming agent in the foaming machine;
    adding the foaming agent to water; and
    utilizing an appropriate water-to-foaming agent ratio.

22. The method of claim 5, further comprising:
    recycling the particulate or aggregate form loose material after conversion in one or more of these applications: embankment fill, trench backfill, void filling, and base or sub-base material for pavements.

23. The method of claim 22, wherein the particulate or aggregate form loose material after conversion further comprises a plurality of cementitious particles that continue to hydrate and contribute to strength gain in the one or more applications over time.

24. The method of claim 22, further comprising:
utilizing the recycled particulate or aggregate form loose material after conversion as coarse aggregate to produce new concrete; and
utilizing the recycled particulate or aggregate form loose material after conversion as fine aggregate to produce new concrete.

25. The method of claim 24, wherein the recycled particulate or aggregate form loose material after conversion further comprises a plurality of cementitious particles that continue to hydrate and contribute to strength gain in the new concrete.

\* \* \* \* \*